United States Patent Office 3,737,344
Patented June 5, 1973

3,737,344
PROCESS FOR INCREASING THE ACTIVITY OF POROUS FUEL CELL ELECTRODES
Klaus V. Benda, Kemnat, Horst Binder, Petterweil, Wolfgang Faul, Julich, and Gerd Sandstede, Frankfurt am Main, Germany, assignors to Volkswagenwerk Aktiengesellschaft, Wolfsburg, Germany
No Drawing. Filed June 3, 1971, Ser. No. 149,767
Claims priority, application Germany, June 4, 1970,
P 20 27 482.2
Int. Cl. H01m 13/00
U.S. Cl. 136—120 FC                10 Claims

ABSTRACT OF THE DISCLOSURE

A process for increasing the activity of porous electrodes which contain tungsten carbide having the composition $WC_{1-x}$, where $0 \leq x \leq 0.2$, and which are used in connection with the anodic oxidation of carbon monoxide, hydrogen or hydrogen-containing fuels in fuel cells that utilize an acid electrolyte. The process involves placing at least one surface of at least one of the untreated tungsten carbide electrode in an alkaline electrolyte containing a reducing agent. A potential of up to +850 mv., measured with relation to a hydrogen electrode in the same electrolyte is applied to the tungsten carbide electrode. The potential is maintained for a period of up to twenty hours. The invention also includes the activated tungsten carbide electrode.

BACKGROUND OF THE INVENTION (1) Field of the invention

The present invention refers to a process for increasing the activity of porous electrodes which contain tungsten carbide with the composition $WC_{1-x}$, where $0 \leq x \leq 0.2$, and which are used in connection with the anodic oxidation of carbon monoxide, hydrogen or hydrogen-containing fuels in fuel cells that utilize an acid electrolyte.

(2) Prior art

It is normally desirable to use acid electrolytes in fuel cells to avoid the carbonation which occurs with alkaline electrolytes as a result of carbon-containing components in the fuel used or of the carbon dioxide content in the air. Platinum or platinum compounds are often used as the catalyst (electrodes), however, the high price and the scarcity of platinum inhibits its wider usage.

Some time ago a substance was found, namely, tungsten carbide (WC), which is resistant against hot (80° C.) 6 N sulphuric acid and which catalyzes the anodic hydrogen oxidation. (See, for example, H. Böhm and F. A. Pohl, Wissenschaftliche Berichte AEG-Telefunken 41 (1968), 46–49.) Tungsten carbide ina finely divided form is suitable as a catalyst. Such finely divided tungsten carbide can be obtained by grinding coarser source materials or by using appropriate separation processes. The catalytic activity of such preparations, however, is not very high which means that only low current densities can be achieved. In addition, the activity of tungsten carbide specimens resulting from different known methods of preparation is very different, even in the case of laboratory preparations. Further, the tungsten carbide is only stable up to a reference potential of about +300 to +500 mv. (here and in the following application and claims all reference potentials relate to a hydrogen electrode in the same solution and at the same temperature). Above those reference potentials the tugsten carbide begins to corrode, at least when no oxidizable fuel is present. The corrosion can be simply proven by registering periodic, potentiodynamic current-voltage graphs according to the triangle voltage method (see H. Binder et al., Chem.-Ing.-Technik, 40 (1968) 543). In the reference potential range above +300 to +500 mv. a strong corrosion current is obtained in the case of known tungsten carbide electrodes. If the experiment is carried out so that the electrode is freely immersed in the electrolyte, a gas formation is clearly detected. Thus, the carbon of the WC is being oxidized to $CO_2$. This reaction can be described by the following gross equation:

$$WC + 5H_2O \rightarrow WO_3 + CO_2 + 10H^+ + 10e^-$$

As the corrosion of the WC progresses the corrosion current becomes smaller, possibly because an oxide layer develops on the electrodes which renders it passive. The oxide formed on the surface of the electrode is inactive as regards the hydrogen reaction, so that on a subsequent measurement a smaller activity for the electrode can also be detected.

Because tungsten oxides go into solution in alkali lyes forming tungstenates, one ordinarily skilled in the art would expect that electrodes which have been activated in an acid electrolyte would show a loss of activity after their treatment with alkali lye.

BROAD DESCRIPTION OF THIS INVENTION

This invention involves a process for increasing the activity of porous electrodes which contain tungsten carbide having the composition $WC_{1-x}$, where $0 \leq x \leq 0.2$, and which are used in connection with the anodic oxidation of carbon monoxide, hydrogen or hydrogen-containing fuels in fuel cells that utilize an acid electrolyte. The process involves placing at least one surface of a tungsten carbide electrode having the composition $WC_{1-x}$, where $0 \leq x \leq 0.2$, into an alkaline electrolyte containing a reducing agent. A potential of up to +850 mv., measured with relation to a hydrogen electrode in the same electrolyte, is applied to the tungsten carbide electrode. A potential in that range is maintained on the tungsten carbide electrode for a period of up to twenty hours. The activated tungsten carbide electrode is then removed from the electrolyte. Preferably the tungsten carbide electrodes have a potential between +600 and +700 mv. applied thereto and preferably that potential is applied for a period of 10 to 15 hours.

The process can be varied by introducing the reducing agent into the alkaline electrolyte after the tungsten carbide is immersed in the alkaline electrolyte.

The tungsten carbide electrode can be activated in an acid electrolyte before it is immersed in the alkaline electrolyte or alkaline electrolyte containing the reducing agent.

This invention also includes the electrodes made by the process of this invention and the use of the electrodes in fuel cells which utilize acid electrolytes.

Quite surprisingly, instead of an activity loss as one ordinarily skilled in the art would expect from the prior art teachings, an activity increase is achieved in an acid electrolyte (and for a longer period of time) when the tungsten carbide electrode is first anodically treated according to the process of this invention in an alkaline electrolyte in presence of a reducing agent. In other words, it has been found that tungsten carbide electrodes which have been anodically treated in an alkaline electrolyte in the presence of a reducing agent subsequently exhibit a considerably higher catalytic activity in an acid electrolyte than the tungsten carbide electrodes first activated in acid electrolytes. Moreover, the higher activity of the tungsten carbide electrodes produced according to this invention is independent of the fact of whether or not the corresponding electrode had first been subjected to an activation in an acid electrolyte. This unexpected higher activation seems to be connected to the formation of hydrogen containing tungsten oxides on the electrode surface. In analogy to this, the electrocatalytic activity of platinum-doped tungsten oxides has been referred to the formation of hydrogen-tungsten bronzes, $H_xWO_3$ (see A.C.C. Tseung and B. C. Hobbs, Platinum Metals Review, 13 (1969), No. 4, 146). The reason of the high activity increase resulting from an activation in alkaline electrolytes is therefore most probably to be found in the formation of an active substance on the whole electrode surface. Applicants advance this theory to help explain their invention but are not bound or limited by this suggested theoretical explanation. While during activation in acid electrolytes a portion of the resultant active surface is covered by the formation of electrocatalytically inactive oxides, such as $WO_3$; the active surface formed during activation according to this invention in alkaline electrolytes containing a reducing agent is maintained free of inactive-covering layers due to the solubility of the formed oxides. This means that the entire active surface is subsequently wholly available for electrocatalysis in acid electrolytes.

Support for this theory is the fact that the periodic potentiodynamic current-voltage curve registered with the triangle-voltage method, whose area represents a measure for the amount of charge needed for changing the potential of the covering layers, encloses a considerably smaller area after activation in alkaline electrolyte containing a reducing agent than after activation in acid electrolyte.

DETAILED DESCRIPTION OF THIS INVENTION

A fuel cell is an electrochemical generator in which the chemical energy from the reaction of air (oxygen) and a conventional fuel (hydrocarbons or some derivative thereof such as hydrogen) is converted directly into electricity. A fuel cell differs from a battery in that it does not consume or convert electrode material and it operates continuously as long as fuel and air are available.

The fuel cell reaction usually involves the combination of hydrogen with oxygen

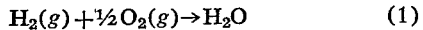

$$H_2(g) + \tfrac{1}{2}O_2(g) \rightarrow H_2O \tag{1}$$

although, in principle, the nature of the reactants is not limited. This invention encompasses the use of its novel electrodes in fuel cells which uses any fuel which can be reacted with tungsten carbide electrodes. Examples of useful fuels are hydrogen (preferred), hydrazine, formaldehyde, formic acid and carbon monoxide.

Mixtures of the various fuels, such as $H_2$ and CO can be used. (It should be noted that large concentrations of CO poison Pt catalysts often used in fuel cells.)

In the direct type of $H_2$-$O_2$ fuel cell, hydrogen and oxygen are used as such, the fuel being produced in independent installations. The indirect type, employs a hydrogen-generating unit which can use as raw material a wide variety of fuel. The reaction taking place at the anode is

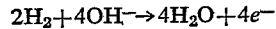

$$2H_2 + 4OH^- \rightarrow 4H_2O + 4e^-$$

and at the cathode is

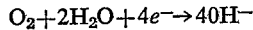

$$O_2 + 2H_2O + 4e^- \rightarrow 4OH^-$$

Because of the low solubility of $H_2$ and $O_2$ in electrolytes, the reactions take place at the interface electrode-electrolyte, requiring a large area of contact. This is obtained with porous electrodes which are called upon to fulfill the following main duties: the porous electrodes must provide contact between electrolyte and gas over a large area, catalyze the reaction, maintain the electrolyte in a very thin layer on the surface of the electrodes and act as leads for the transmission of electrons. The thickness of the electrolyte layer, on which depends the internal resistance of the cell, is controlled by pore size, wetting properties, and pressure of the fuel gas. When pressure is used, care must be taken not to increase it to the extent that gas is allowed to bubble through the electrolyte hydrogen-oxygen mixture. Similar types of instructions, consideration and theory apply to the use of other fuels.

A fuel cell also uses an oxidizer which is normally oxygen or air.

In general, this invention uses the known acid-electrolyte type of fuel cell replacing the known tungsten carbide electrode with applicants' novel tungsten carbide electrode.

All reference potentials herein relate to a hydrogen electrode in the same solution and at the same temperature.

Porous tungsten carbide electrodes are required and such porous electrodes can be produced by the known methods of plastic binding or by sintering. Example 1 sets forth the preferred sintering method in detail. Sintering is usually carried out at about 1300° C. When flooding of the pores is feared, the electrode is made with double porosity, fine at the electrolyte side and coarse at the gas side. Tungsten carbide, WC, can be formed by heating a mixture of the elements to 800° C. to 1600° C. Finely divided tungsten carbide can be obtained by grinding coarser source materials or by using appropriate particle separation processes.

Particularly active tungsten carbide electrodes can be obtained if the ingredients of the tungsten carbide used to make such electrodes is not exactly stoichiometrically combined according to the formula WC but contains a slight deficit of carbon. A carbon deficiency of up to 20 atom percent gives good results, but a carbon deficiency of about 5 atom percent is preferred.

According to a preferred embodiment of the invention the potential applied to the electrodes ranges between +600 and +700 mv., and the electrodes are maintained for 10 to 15 hours at a potential in this range.

A reducing agent is an agent effecting the reduction of a substance or a substance capable of supplying electrons to another substance, hence capable of reducing it. Any reducing agent can be used which is compatible with the system of producing electrodes of this invention. The most preferred reducing agent is formaldehyde, although excellent results are obtained with hydrazine or hydrogen.

Mixtures of the various reducing agents can be used.

The alkaline electrolyte can be any alkaline or base substance which will conduct an electric current by ions in solution. Inorganic bases can be used as the alkaline electrolyte, examples of which are ammonium hydroxide, sodium hydroxide, potassium hydroxide, sodium carbonate, potassium carbonate, $NH_4Cl$, LiOH and NaCl. The preferred alkaline electrolytes are alkaline lye solutions of NaOH or KOH. The solutions contain 18 to 30 percent of the NaOH or KOH. NaOH is cheaper but KOH has a lower resistance.

Organic alkaline electrolytes can be used, but are less preferred than inorganic alkaline electrolytes because of their generally low conductivity and because most organic substances react at the electrode potentials in undesired way. Mixtures of the various alkaline electrolytes can be used.

The alkaline electrolytes which are solutions usually contain 10 to 50 percent by weight of alkaline material, based on the total weight of the alkaline electrolyte, and preferably from 15 to 30 percent by weight on the same basis.

Any conventional inorganic solvent can be used which is a solvent for the alkaline electrolytic material and the reducing agents. Water is usually preferred.

The tungsten carbide electrodes can have been pretreated by activation in an acid electrolyte. The acid electrolyte can be any acid subtsance which will condut an electric current by ions in solution. Inorganic acids can be used as the acid electrolyte, examples of which are: $H_2SO_4$, $H_2PO_4$, $H_5PO_5$, and chromic acid.

Organic acids are generally less useful as acid electrolytes. Mixtures of acid electrolytes can be used.

The acid electrolyte should normally be one which does in no way react with tungsten carbide electrodes. A concentrated $HNO_3$—HF solution cannot be used as the acid electrolyte because it attacks tungsten carbide.

Any common type solvent for the acid electrolytes can be used.

After the electrodes are prepared by the method of this invention, they can be used in fuel cells which utilize acid electrolytes. Any of the above types acid electrolytes can be used. Acid electrolytes may require somewhat costly corrosion-resistant construction materials but they are not sensitive to CO and $CO_2$ in the fuel. So it is seen that, for among other reasons, acid electrolytes are used because they help to eliminate the carbonation in fuel cells which occurs when alkaline electrolytes are used. That carbonation occurs with alkaline electrolytes as a result of carbon-containing components in the fuel used or of the carbon dioxide content in the air.

Unless otherwise stated or indicated, in the following examples, all percentages and proportions are expressed on a weight basis.

The following examples further illustrate, but do not limit, this invention.

EXAMPLE 1

10 gm. of tungsten powder with an average size of approximately 1 μm. were mixed with 0.653 gm. of carbon (soot), which stoichiometrically corresponds to the amount of metal, in a ball grinder for about 3 hours. After admixing, one gram units of the admixture were each mixed with finely pulverized ammonium carbonate in a volume proportion of 40:60, each placed into a cylindrical mold having 13 mm. diameter, and each pressed with a pressure of 5Mp./cm.$^2$. About 2 mm. thick tablets are obtained, from which the ammonium carbonate was separated under vacuum at 100° C. The tablets were placed in a graphite pot and heated in a hydrogen atmosphere at 1300° C. for 3 hours. During the course of this operation the metal (W) and the carbon formed tungsten carbide grains which tightly sintered to each other, while the holes produced by the earlier removal of the ammonium carbonate were essentially preserved intact. The disk-shaped, sintered porous tungsten carbide electrodes obtained in this way were very stable and could be directly used as conventional fuel cells.

Several of the electrodes were tested in fuel cells using acid electrolytes. Periodic potentiodynamic current-voltage graphs were obtained for such electrodes. At a reference potential of +300 mv. for the anodic oxidation of hydrogen in 2 N sulfuric acid, a current density of approximately 60 ma./cm.$^2$ was achieved (the electrodes had not been treated by the method of this invention).

EXAMPLE 2

One of the electrodes (produced as set forth in the first paragraph of Example 1) was activated by anodic treatment at +680 mv. in the presence of formaldehyde, as the reducing agent, in a 6.5 N potassium carbonate solution at 70° C. and for 15 hours. The activated electrode was carefully washed with distilled water. The activated electrode was placed in a fuel cell which used 2 N sulfuric acid as the acidic electrolyte and hydrogen as the fuel. A current density of approximately 200 ma./cm.$^2$ was measured for the hydrogen oxidation in 2 N sulphuric acid when a potential of +300 mv. was applied to the tungsten carbide electrode. Thus, the hydrogen reaction had been more than tripled due to the activation by the method of this invention, while an activation in an acid electrolyte would have caused, at the most, a doubling of the hydrogen reaction.

EXAMPLE 3

Example 2 was repeated except that the 6.5 N potassium carbonate solution was replaced with an equal amount of a 6.5 N potassium hydroxide solution. A large activity increase of the novel tungsten carbide electrode was obtained, along with large current density increases when a set potential was applied when compared with known tungsten carbide electrodes which had not been pretreated with alkali electrolytes containing reducing agents.

EXAMPLE 4

Example 2 was repeated except that the 6.5 N potassium carbonate solution was replaced with an equal amount of a 6.5 N potassium sulfate solution. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 5

Example 2 was repeated except that the 6.5 N potassium carbonate solution was replaced with an equal amount of 6.5 N sodium hydroxide solution. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 6

Example 2 was repeated except that the hydrogen fuel was replaced with formaldehyde as the fuel. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 7

Example 2 was repeated except that the hydrogen fuel was replaced with hydrazine as the fuel. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 8

Example 2 was repeated except that the hydrogen fuel was replaced with formic acid as the fuel. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 9

Example 2 was repeated except that the hydrogen fuel was replaced with carbon monoxide. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 10

Example 2 was repeated except that the electrode was first subjected to a potential of +300 mv. in a 2 N sulfuric acid bath for 5 hours. A large activity increase of the novel tungsten carbide electrode was obtained, along with large current density increases when a set potential was applied, when compared with known tungsten carbide electrodes which had not been pretreated with alkali electrolytes containing reducing agents.

EXAMPLE 11

Examples 1 and 2 were repeated except that the tungsten carbide electrode had a formulation of $WC_{0.95}$. A large activity increase of the novel tungsten carbide electrode was obtained, along with large current density increases when a set potential was applied, when compared with known tungsten carbide electrodes, which had not been pretreated with alkali electrolytes containing reducing agents.

What is claimed is:

1. A process for increasing the activity of porous electrodes which contain tungsten carbide having the composition $WC_{1-x'}$ where $0 \leq x \leq 0.2$, and which are used in connection with the anodic oxidation of carbon monoxide, hydrogen or hydrogen-containing fuels in fuel cells that utilize an acid electrolyte which comprises:
   (a) placing at least one surface of at least one of said tungsten carbide electrodes having the composition $WC_{1-x'}$ where $0 \leq x \leq 0.2$, in an alkaline electrolyte containing a reducing agent;
   (b) applying a potential of up to +850 mv., measured with relation to a hydrogen electrode in the same electrolyte, to said tungsten carbide electrode;
   (c) maintaining a potential in said range (b) on said tungsten carbide electrode for a period of up to twenty hours; and
   (d) removing said activated tungsten carbide electrode from said electrolyte.

2. A process as described in claim 1 wherein said tungsten carbide electrode is activated by subjecting the said electrode to a potential of +300 mv. for 5 hours in an acid bath prior to step (a), activated in an acid electrolyte.

3. A process as described in claim 1 wherein $x$ is 0.05.

4. A process as described in claim 1 wherein said electrode has a potential between +600 and +700 mv. applied thereto and said potential is maintained for a period of 10 to 15 hours.

5. A process as described in claim 1 wherein said reducing agent is an aldehyde.

6. A process as described in claim 5 wherein said aldehyde is formaldehyde.

7. A process as described in claim 1 wherein said reducing agent is hydrazine.

8. A process as described in claim 1 wherein said reducing agent is hydrogen.

9. A process as described in claim 1 wherein said alkaline electrolyte is potassium hydroxide.

10. A process for increasing the activity of porous electrodes which contain tungsten carbide having the composition $WC_{1-x'}$ where $0 \leq x \leq 0.2$, and which are used in connection with the anodic oxidation of carbon monoxide, hydrogen or hydrogen-containing fuels in fuel cells that utilize an acid electrolyte which comprises:
   (a) placing at least one surface of at least one of said tungsten carbide electrodes having the composition $WC_{1-x'}$ where $0 \leq x \leq 0.2$, in an alkaline electrolyte;
   (b) introducing a reducing agent into said alkaline electrolyte so that said tungsten carbide electrode is contacted by said reducing agent;
   (c) applying a potential of up to +850 mv., measured with relation to a hydrogen electrode in same electrolyte, to said tungsten carbide electrode;
   (d) maintaining a potential in said range (c) on said tungsten carbide electrode for a period of up to twenty hours; and
   (e) removing said activated tungsten carbide electrode from said electrolyte.

References Cited
UNITED STATES PATENTS

| | | | |
|---|---|---|---|
| 3,393,100 | 7/1968 | Medrach | 136—120 FC |
| 3,507,701 | 4/1970 | Broyde | 204—291 |

WINSTON A. DOUGLAS, Primary Examiner

H. A. FEELEY, Assistant Examiner

U.S. Cl. X.R.

136—86 D